US008005748B2

(12) United States Patent
Newman (10) Patent No.: US 8,005,748 B2
(45) Date of Patent: Aug. 23, 2011

(54) INTELLECTUAL PROPERTY DISTRIBUTION SYSTEM AND METHOD FOR DISTRIBUTING LICENSES

(76) Inventor: David L. Newman, Highland Park, IL (US)

( * ) Notice: Subject to any disclaimer, the term of this patent is extended or adjusted under 35 U.S.C. 154(b) by 248 days.

(21) Appl. No.: 12/069,753

(22) Filed: Feb. 13, 2008

(65) Prior Publication Data
US 2008/0281748 A1    Nov. 13, 2008

Related U.S. Application Data

(63) Continuation-in-part of application No. 11/521,423, filed on Sep. 14, 2006.

(60) Provisional application No. 60/902,252, filed on Feb. 20, 2007.

(51) Int. Cl.
*G06Q 40/00* (2006.01)
(52) U.S. Cl. .............................. 705/37; 705/59
(58) Field of Classification Search ........... 705/1, 35–40
See application file for complete search history.

(56) References Cited

U.S. PATENT DOCUMENTS

| | | | |
|---|---|---|---|
| 5,890,138 A | 3/1999 | Godin et al. | |
| 5,991,751 A * | 11/1999 | Rivette et al. | 707/1 |
| 5,999,907 A * | 12/1999 | Donner | 705/1 |
| 6,018,714 A * | 1/2000 | Risen et al. | 705/4 |
| 6,175,824 B1 | 1/2001 | Breitzman et al. | |
| 6,321,205 B1 | 11/2001 | Eder | |
| 6,330,551 B1 | 12/2001 | Burchetta et al. | |
| 6,556,992 B1 * | 4/2003 | Barney et al. | 1/1 |
| 7,415,436 B1 * | 8/2008 | Evelyn et al. | 705/37 |
| 2001/0034695 A1 | 10/2001 | Wilkinson | |
| 2001/0042034 A1 * | 11/2001 | Elliott | 705/35 |
| 2002/0002524 A1 * | 1/2002 | Kossovsky et al. | 705/36 |
| 2002/0004775 A1 | 1/2002 | Kossovsky et al. | |
| 2002/0022974 A1 * | 2/2002 | Lindh | 705/3 |
| 2002/0032659 A1 * | 3/2002 | Waters | 705/54 |
| 2002/0035499 A1 * | 3/2002 | Germeraad et al. | 705/9 |
| 2002/0046038 A1 * | 4/2002 | Prokoski | 705/1 |
| 2002/0065675 A1 * | 5/2002 | Grainger et al. | 705/1 |
| 2002/0065677 A1 * | 5/2002 | Grainger et al. | 705/1 |
| 2002/0069079 A1 * | 6/2002 | Vega | 705/1 |
| 2002/0072920 A1 * | 6/2002 | Grainger | 705/1 |
| 2002/0077835 A1 * | 6/2002 | Hagelin | 705/1 |
| 2002/0082967 A1 | 6/2002 | Kaminsky et al. | |
| 2002/0082973 A1 | 6/2002 | Marbach et al. | |
| 2002/0087448 A1 * | 7/2002 | Wilkinson | 705/36 |
| 2002/0091543 A1 * | 7/2002 | Thakur | 705/1 |

(Continued)

OTHER PUBLICATIONS

Cybersettle, "Web-assisted Claim Resolution Services," Nov. 14, 2006; www.cybersettle.com.

(Continued)

*Primary Examiner* — Thomas M Hammond, III (57) ABSTRACT

A license exchange is provided that allows for companies who desire to obtain licenses for intellectual property and speculators to bid in order to set pricing for license contracts that provide for market rates to be set for such licenses. The exchange insures liquidity for such license contracts by providing market makers, scarcity features or modules and predetermined trading periods. In an embodiment the exchange may provide an electronic auction where license contracts may be traded by parties including patentees who may wish to avoid litigation and obtain fair and reasonable royalties for the patents underlying the license contracts being traded. The exchange also provides an alternate licensing resolution process where IP can be evaluated with respect to validity, valuated to determine a fair license rate and auctioned to licensees in a transparent bidding process.

19 Claims, 3 Drawing Sheets

U.S. PATENT DOCUMENTS

| | | | |
|---|---|---|---|
| 2002/0095368 A1* | 7/2002 | Tran | 705/37 |
| 2002/0099637 A1* | 7/2002 | Wilkinson et al. | 705/36 |
| 2002/0178029 A1* | 11/2002 | Nutter et al. | 705/1 |
| 2003/0023536 A1 | 1/2003 | Hollerman et al. | |
| 2003/0028460 A1* | 2/2003 | Kraemer | 705/36 |
| 2003/0036945 A1* | 2/2003 | Del Vecchio et al. | 705/10 |
| 2003/0061064 A1* | 3/2003 | Elliott | 705/1 |
| 2003/0101073 A1* | 5/2003 | Vock | 705/1 |
| 2003/0172020 A1* | 9/2003 | Davies et al. | 705/36 |
| 2003/0182141 A1* | 9/2003 | Wiedemann et al. | 705/1 |
| 2003/0225657 A1 | 12/2003 | Whaley et al. | |
| 2003/0225658 A1 | 12/2003 | Whaley | |
| 2004/0215538 A1 | 10/2004 | Smith et al. | |
| 2004/0220842 A1* | 11/2004 | Barney | 705/7 |
| 2004/0261011 A1 | 12/2004 | Stuckman et al. | |
| 2005/0021434 A1* | 1/2005 | D'Loren | 705/36 |
| 2005/0038730 A1 | 2/2005 | Reader | |
| 2005/0102214 A1 | 5/2005 | Speth et al. | |
| 2005/0108118 A1 | 5/2005 | Malackowski et al. | |
| 2005/0177378 A1 | 8/2005 | Tazawa | |
| 2005/0256777 A1 | 11/2005 | Kotera et al. | |
| 2006/0100948 A1 | 5/2006 | Millien et al. | |
| 2006/0259315 A1* | 11/2006 | Malackowski et al. | 705/1 |
| 2007/0219855 A1* | 9/2007 | Van Luchene et al. | 705/11 |
| 2008/0215474 A1* | 9/2008 | Graham | 705/37 |
| 2009/0070150 A1* | 3/2009 | Malackowski et al. | 705/4 |

OTHER PUBLICATIONS

IP Law 360, "Judge Sides with Cybersettle In Patent Dispute," by Shannon Henson, Nov. 13, 2006.

Patent Ratings Chart, Aug. 10, 2005, www.patentratings.com.

PatentCafe PF/i Report, Patent Factor Index Report, Generated Jun. 15, 2005, www.iamcae.com.

PR Patent Ratings, Patent Quality Ratings, Valuations, Research and Consulting, website, www.patentratings.com.

PatentRatings, LLC, "Identifying and Managing Patent Quality," by Jonathan A. Barney, 2002, Powerpoint.

\* cited by examiner

INTELLECTUAL PROPERTY DISTRIBUTION SYSTEM AND METHOD FOR DISTRIBUTING LICENSES

This application is a continuation in part and claims the benefit of patent application Ser. No. 11/521,423 filed Sep. 14, 2006, and also claims the benefit of provisional patent application No. 60/902,252 filed Feb. 20, 2007.

The present invention pertains to a market for licenses, license contracts to be traded in the license market and a method for distributing intellectual property.

BACKGROUND

Technology plays an ever-increasing importance in society. However, the ability for third parties to invest in technology, for intellectual property (IP) users to pay fair royalties for use of the technology and IP owners to receive fair compensation for use of their technology remains limited.

An investor today who identifies a specific technology that he or she believes is promising and is worth investing in, is left with only a few choices. If the technology is owned by a public company then the investor may buy stock in that public company. However, the performance of that stock may not be affected solely by that sole technology; as the company may be involved in many different technology areas and the stock performance may be affected by many other factors. If an investor is interested in technology owned by a private company, then the investor must make a direct investment with that private company. Again, the investment in the entire company may be affected by many other factors; as such a company may market other products and technologies, other than the sole technology that the investor is interested in focusing on.

With respect to companies who want to use technology and obtain licenses for technology that is patented by a third party or covered by another's trade secret, the avenues for obtaining proper licenses are limited. Basically the company must negotiate a license with the technology owner. In such circumstances the technology owner generally has the upperhand as it can refuse to set royalty rates that the purchasing party may feel are reasonable. Such an uneven playing field causes companies to ignore patents or steer away from such license negotiations. In fact, licensing rarely occurs voluntarily by the company that makes use of the technology. It is more likely that the patent owner or technology owner must confront the company and accuse it of infringement before any license is negotiated. In many circumstances litigation occurs prior to the execution of a license.

Litigation is often an undesirable process and does not always lead to a just outcome for either party. Even where a judge or jury may determine what is a so-called "reasonable royalty," the parties are rarely satisfied with the outcome. Corporations are being threatened with patent infringement lawsuits at an increasing rate. At such a juncture the corporation has two options: 1) take a license at the rate demanded by the patent owner, or 2) go forward with litigation costing multi-million dollars. Neither of these options are practical or desirable.

Finally, the patent and technology owners who believe that their technology is being exploited by others, without proper compensation, face enormous risks in litigating via patent infringement lawsuits. With the unpredictability of the litigation process and the enormous costs in attorneys' fees reaching nearly $2 million per patent infringement lawsuit it is only the rare patent that can be asserted. As well, due to the enormous expenses in litigation costs the patent owner only may be able to pursue a single infringer at a time through litigation. And only if and when that litigation ends successfully, with an award or settlement including lump sum payments or on-going royalties, can the patent owner move on to the next infringer.

Therefore, the current marketplace for licensing patents and other technology has many inefficiencies and disadvantages for all parties involved. Therefore, there is desired a new marketplace for patents and other technology which allows for greater distribution of technology and provides a means of establishing reasonable compensation for the technology owners.

SUMMARY

The present invention concerns an IP license marketplace or exchange which will provide for increased distribution of technology and for the ability to set reasonable rates for such technology. Such a marketplace will allow for third parties to become involved and to invest in particular technologies on a patent-by-patent basis or based on individual patent portfolios. The license market will allow for those who desire to use the technology to hedge their positions while they are developing technology prior to taking a license or during litigation over such technology. The license market will also provide for IP owners a means of obtaining investment early on in order to fund possible litigation and also a means of setting fair royalty rates that are set by market forces.

While the preferred embodiments described herein focus on patents and patent licenses, the license market could work just as well for trade secret technology, trademarks, copyrights, and any other type of intellectual property.

In an embodiment, the exchange takes attributes from many commonly known markets including derivatives such as options and futures contracts. In an embodiment, the present invention is a patent license contract which is traded on a public exchange electronically or on a trading floor via the open outcry process. The market where such patent license contracts may be traded may be a patent license exchange. In an embodiment, the exchange comprises an exchange platform where license contracts may be traded. The platform may include a system for posting license contract prices, a purchasing feature or module (e.g. supported by a computer server and software) for providing the purchase of the license contracts, a selling feature or module (e.g. supported by a computer server and software) for providing the selling of the license contracts and a clearing feature or module (e.g. supported by a computer server and software) to provide for the execution of the license contracts. The exchange may provide for the electronic trading of the license contracts. The license exchange may provide reports with regard to the underlying intellectual property including patent reports which provide for key valuation criteria.

In an embodiment, the present invention may provide a license contract comprising a price that correlates to a royalty rate and include preset non-variable license terms including the royalty basis, up front payments and exclusivity and a term of the contract. The license contract may be a futures contract for purchasing the right to obtain a license at a future date. The price of the license contract may fluctuate based on the trading of the license contract.

In an embodiment the license rate bid upon in the auction may be a total rate for a paid-up license under the license contract. In an embodiment, the license rate may be a per unit rate under the license contract. In an embodiment, the exchange platform may allow for companies who wish to obtain licenses and speculators to electronically enter bids using the exchange platform. In an embodiment, the clearing feature or module (e.g. supported by a computer server and software) may ensure that parties who have acquired license contracts will execute the contracts and the underlying license agreements according to the terms of the license contracts. In an embodiment, the exchange platform may provide for license auctions and further includes a liquidity feature for assuring sufficient liquidity so that buyers and sellers will be present during the auction process. In an embodiment, the liquidity feature may comprise at least a market maker, a scarcity feature or module to control the number of contracts available or a controlled auction period for maximizing the number of transactions that may occur during each auction. In an embodiment, the license contract pertains to intellectual property including a patent.

In another embodiment the invention pertains to a license contract for trading in a marketplace comprising contract terms including a price that correlates to a royalty rate, preset license terms including the royalty basis, up front payments, exclusivity terms and a term of the contract. In an embodiment, the contract may be traded in an exchange in order to set a market price for the price of the contract. In an embodiment, the contract further comprising a futures contract for purchasing the right to obtain a license at a future date. In an embodiment, the price of the license contract may fluctuate based on the trading of the license contract.

In a further embodiment of the invention a method of trading a license contract is provided comprising the steps of providing an exchange platform for entering offers to buy and sell license contracts, entering an offer to sell the license contract at a price that correlates to a royalty rate, entering an offer to purchase the license at the price and executing the license contract and obtaining a license at the royalty rate. In an embodiment, the license contract may pertain to intellectual property including a patent and the contract includes non-variable license terms including the royalty basis, up front payments, exclusivity terms and a term of the contract. In an embodiment, the exchange platform may provide for electronic trading by buyers and sellers using a transparent process so that all trades are posted in real time and providing a uniform price auction. In an embodiment, the license contract may relate to intellectual property and further comprise the step of posting the license contract on the exchange platform prior to using the underlying intellectual property in litigation so that allegedly infringing parties may obtain licenses at rates set by the exchange. In an embodiment, a computer readable medium is provided for establishing a purchasing feature, a selling feature and a clearing feature for handing the offer to purchase, the offer to sell and execution of the contract, respectively. In an embodiment, the method may further comprise the step of paying the license contract owner a premium upon purchase of each contract. In an embodiment, the exchange platform may provide for a single auction on each individual license contract and the method further comprising the step of limiting the number of licenses to be granted for the underlying intellectual property and including in the contract terms an explicit identification of the maximum number of licenses to be granted in a specific field of use in order to insure for purchasers of the license contracts that the price being bid cannot be undercut by parties in another auction separate from the single auction.

In an alternate embodiment the invention of a license market comprises an exchange platform where license contracts may be traded, the platform including a system for posting license contract prices, license contract terms, a simultaneous multiple price bidding term and a correlation feature for correlating the contract price to a license rate; a purchasing feature for providing the purchase of the license contracts; a selling feature for providing the selling of the license contracts; and a clearing feature to provide for the execution of the license contracts.

In an embodiment the simultaneous multiple price bidding term includes a royalty rate, a total rate for a paid-up license under the license contract and a per unit rate under the license contract. In an embodiment the exchange platform includes a server that allows for companies who wish to obtain licenses and speculators to electronically anonymously enter bids using the exchange platform. In an embodiment the exchange platform provides for license auctions and further includes a liquidity feature for assuring sufficient liquidity so that buyers and sellers will be present during the auction process. In an embodiment the liquidity feature comprises at least a market maker, a scarcity feature to control the number of contracts available or a controlled auction period for maximizing the number of transactions that may occur during each auction. In an embodiment the license contract pertains to intellectual property including a patent.

In another embodiment, the invention provides a license contract for trading in a marketplace comprising contract terms including a price that correlates to a bidding term; preset license terms including a rate term, up front payments, exclusivity terms and a term of the contract; and the license contract being traded according to a modified Dutch auction procedure.

In an embodiment, the contract may be traded in an exchange in order to set a market price for the price of the contract. In an embodiment a futures contract is provided for purchasing the right to obtain a license at a future date. In an embodiment the price of the license contract is set according to an open auction process where the licensor chooses a uniform clearing price selected from a group of different prices from bidders.

A further embodiment of the invention provides a system for distributing IP comprising an initial IP input area; a secondary IP evaluation and certification area; and an IP license auction area for distributing IP via a modified Dutch auction. In an embodiment the input area, evaluation area and auction area are hosted by a Website and bidders may place simultaneous multiple price bidding terms.

Another embodiment of the invention provides an alternative licensing resolution method for distributing IP comprising the steps of receiving a description of IP; evaluating the validity of the IP; valuing the IP; posting evaluation data for review by potential licensees; and auctioning licenses for the IP. In an embodiment the receiving, posting and auctioning occur at a Website and bidders place simultaneous multiple price bidding terms. In an embodiment the auction is modified Dutch auction format. In an embodiment a certification step is provided with respect to confirming validity of the IP and setting a reasonable license rate. In an embodiment an exchange platform is provided including a server connected to the internet and a database for storing auction data and for auctioning the IP. In an embodiment a price for the IP is set according to an open auction process where a licensor chooses a uniform clearing price selected from a group of different prices from bidders. In an embodiment the IP may be a patent license. In an embodiment a reexamination step is provided where third parties can submit prior art pertinent to the IP that was evaluated prior to the auction.

BRIEF DESCRIPTION OF THE DRAWINGS

The drawing discloses an exemplary embodiment exhibiting only various objectives and features of the present invention.

DETAILED DESCRIPTION

As discussed above, the present invention may take on features commonly understood with regard to the traditional trading of stocks, options, bonds and/or futures contracts and uses features of well known trading systems such as open outcry trading, electronic trading systems, auctions, etc. As well, the present invention need not only provide a market for the trading of patents or patent licenses, but other types of intellectual property as well. Although the embodiments discussed below focus with respect to patent license contracts the present invention is not to be so limited.

Figure 1A:
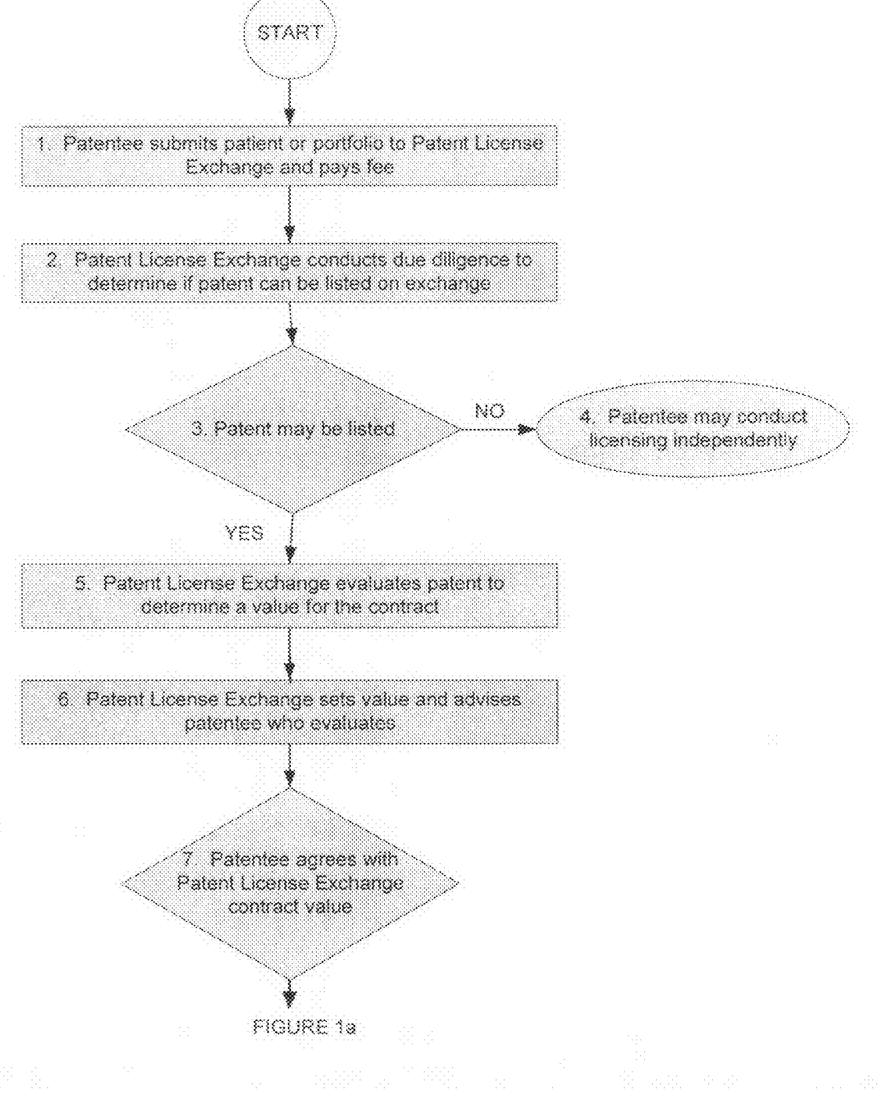
FIGS. 1a, b is a flow chart describing an embodiment of the license market system of the present invention.
Figure 1B:
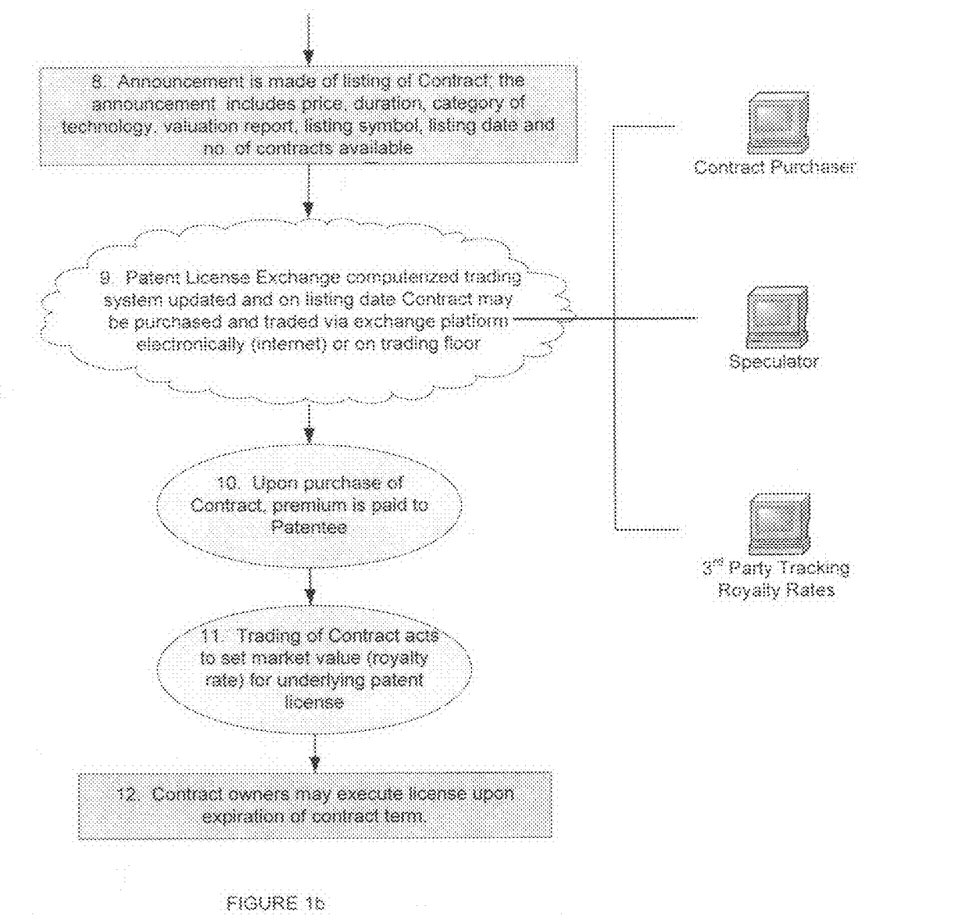

The steps disclosed in FIG. 1 will be discussed in detail and thereafter the architecture that comprises the intellectual property/patent license market or exchange 10 ("exchange") depicted in FIG. 2. At step no. 1 the patentee submits a patent or patent portfolio to a patent license exchange 10 and pays a fee. The fee that is set may be a standard uniform fee for all applicants who wish to have their patent or patent portfolio listed on the exchange 10. The fee should be set in order to cover the administrative costs of entering the patent into the exchange system 10 and for any underlying valuation that must occur for the patent. In an embodiment, the exchange 10 itself or through the use of third parties such as investment bankers or patent licensing consultants including investment experts, market experts, patent attorneys and licensing experts, will evaluate each patent and arrive at certain valuations. The fee should be set to be high enough so that only serious patent holders may submit their patent to the exchange 10. However, the fee must be lower than the cost of litigation. For example, the fee should likely be less than $1 million, as some patents can be litigated for this price. The underlying benefit of the exchange 10 of the present invention is to provide an alternative to litigation. Overall, the exchange 10 should provide an efficient and reasonable way for patent owners to obtain more licensees for their patents. For example, a fee of between $75,000 to $250,000 should cover the cost of the due diligence and provide a gate-keeping future so that only serious patent owners and those who believe strongly in the strength of their patents will apply to have their patents listed on the exchange 10. The patent owner must agree that once it submits its patent to be auctioned on the exchange 10 that it cannot later offer licenses in the same field of use as being offered under the exchange 10.

At step no. 2 a committee of the exchange 10 conducts due diligence to determine if a patent can be listed on the exchange 10. Such due diligence will be conducted by the above discussed group of people including investment bankers, licensing experts, market experts, technology experts and patent attorneys. These experts and the exchange 10 should develop uniform criteria for evaluating patents in order to rate the patents, the claims and the chances for success. Along with the individual analysis of each particular patent and its claims, other means of evaluation may be included as well. For example, there are well-known computerized valuation systems, available such as offered by patentratings.com and patentcafe.com, that are incorporated by reference herein. These systems have computerized methods of evaluating patents based on classification, number of words in the claims, technology area, payment of maintenance fees and cross-referencing of the patents either forward or backwards, etc. All this data is analyzed by the exchange committee and a uniform report developed for each patent.

In certain circumstances that exchange committee will determine that the patent is not entitled to be listed on the patent license exchange 10. Such reasons may be that the patent is believed to be invalid, the patent is unenforceable or there is determined to be no market for the license if it were listed (e.g., there are few or no infringers of the underlying patent). The determination that there are few infringers of the underlying patent may be a point of debate for some patents; in such a determination it would be based on an interpretation of the claims and whether particular claims of the patent are infringed. In such instances, groups of patent attorneys may be called on to opine with respect to the scope of the claims of patents in order to determine questions of infringement. While such determinations do not carry the weight of a decision of a federal court; these determinations however may be a fairly reliable means of fairly determining whether to list the patent on the exchange 10. The exchange committee and its patent attorneys should follow the established rules and patent laws present at the time.

At step 3, the patent owner is provided with the data by the exchange committee such as the underlying patent report. Based on the data the patent owner may decide whether to list its patent on the patent license exchange 10. The patent owner must weigh the benefit of having the patent listed on the exchange 10 which provides for some screening and indication of the strength of the patent. If the patent owner does not agree with the valuation of the patent (including the price set for the contract) there may be procedures set up for the patent owner to submit additional data in order to support a better valuation or higher price, e.g., higher royalty rate. In certain circumstances a patent owner may want the exchange's valuation report to be published, so that it is clear that the public understands that the decision to not list the patent on the exchange 10 was due to the rate set and not for other reasons such as a determination that the patent is not infringed or is invalid. Therefore, a mechanism should be provided by the exchange 10 to allow for the publication of certain information at the patent owner's request.

At step 4, the patent owner may decide not to list his patent on the exchange 10. The patentee of course still has all of the other legal means available, such as litigation.

At step 5, after the patent is determined to be valid and enforceable by the committee of the exchange 10 and after the patent owner agrees to submit the patent for listing the patent for a one-time only licensing auction, a price may be set by the patent committee. In an alternate embodiment, it may be determined that steps 5 and 6 should be combined. Otherwise the two separate steps allow for another fee to be paid by the patent owner to the exchange 10.

At step 6 the exchange 10 sets the value and advises the patent owner. The patentee can then determine whether the patent should be listed on the exchange 10, as discussed above. Based on the valuation, the exchange committee will determine which term(s) of the license will be variable and correlated to the license contract price. The committee will then set a value or initial starting price for the contract based on the variables in the contract. For example, in an embodiment, the price may be the variable term of the contract chosen by the committee and or patentee and be set to correlate to a royalty rate. For example, a price set at a $5,000 could correlate to a royalty rate of 5% to be paid when the contract is closed and the underlying license is executed. In other words, the purchaser of the contract obtains the right at the end of the term (e.g., one year) to obtain the license at a 5% royalty based on a set royalty basis explained in the underlying contract (e.g., net sales price of component X of a widget).

If the exchange 10 believes that the submitted patent is listable it will advise the patent owner that it may list the patent on the exchange 10 and the price at which the contract should be listed (e.g., $5,000 per contract). Other terms of the license may also be determined to be variables that will be set during auction on the exchange 10. In most, cases, however, only a single term (e.g. the royalty rate) of the license will be set by the auction process. Patents which the exchange 10 agrees are to be listed patents are only those which the exchange 10 deems are valid and enforceable and for which there are many potential purchasers of the patent license contracts (in other words, where there are multiple infringers of the underlying patent). After the price has been set, the patent owner may decide not to have his patent listed on the exchange 10. For example, the patent owner may feel that the price set by the committee of the exchange 10 is too low and that it can do better by pursuing licenses independently through litigation.

At step 7, the patentee who agrees with the valuation may decide not to list the patent on the exchange 10 and may resort to other means such as step 4 via litigation to enforce its patent. The patent owners who agree with the listing price and would like to have their patent listed on the exchange 10 will execute an agreement with the exchange 10 and proceed to have the patent listed.

The exchange 10 may want to determine if a certain amount of money should be reimbursed to the patent owner who decides not to list their patent on the exchange 10 due to a negative report on the patent. Because some of the investment anticipated by the exchange 10 were the administrative costs to actually list the patent on the exchange 10; these costs will not be incurred if the patent owner has decided not to list and such fees might be returned to the patent owner. On the other hand, the exchange 10 also may have a process by which the additional maintenance costs are collected at the time the patent owner decides to list the patent in order to cover the costs of the actual listing.

In step 8, an announcement or posting is made by the exchange 10 of the listing of the patent license contract. The announcement includes the price of the contract, the duration of the contract (e.g., the term), technology subject matter category under which the contract will be listed, the listing symbol, the listing (auction) date, the number of contracts available and also the valuation report for the patent will be made available. All of this data is listed in the contract and is made publicly available well in advance of the listing date. In addition, the standard terms of the license underlying the contract are also made available. Most terms will be standardized and non-variable, such as the non-exclusivity of the license, a geographic provision of either in the United States or worldwide, related foreign patents, termination clauses, assignability clauses, auditing provisions and choice of law provisions if the contract is breached. A clause including a termination and penalty for the licensor might be included as well. For example, the termination clause might state that the patent owner agrees that licenses under the patent in a particular field of use shall only be granted during the auction being held by the exchange 10 and that if any licenses are granted after the auction the patent owner grants a royalty free license to the licensee, or that the license may be terminated and the patentee agrees to pay a penalty. One term that may be variable in each contract is the underlying basis for the royalty. Where the patent is based on a specific component that can be easily identified, the license may be based on the net sales price of that component. In other types of technologies, where multiple components provided by an assortment of parts contribute to the underlying technology or patented component, other means of determining the royalty basis may be provided. All of the information concerning the contract may be provided electronically and may be searchable on a website of the exchange 10.

Step 9 is the updating of the exchange computerized trading system 10 in order to provide for the trading of the new contract which is to be listed. At the listing date, the contract goes live and the contract may be traded either electronically or on a floor where individuals can trade contracts via an open outcry system.

The invention may be implemented using conventional general purpose computers programmed according to the teachings of the present invention, as will be apparent to those skilled in the computer art. Appropriate software can be readily prepared by programmers of ordinary skill in the art based on the teachings of the present disclosure.

An appropriate computer system may include a bus or other communication mechanism for communicating information and a processor coupled to a bus for processing the information. The computer system may include a main memory, such as a random access memory (RAM) or other dynamic storage device, coupled to bus for storing information and instructions to be executed by processor. The computer system may include a read only memory (ROM) or other static storage device coupled to the bus for storing static information and instructions for processor. A storage device, such as a magnetic disk or optical disk may be provided and coupled to the bus.

The computer system may be coupled via bus to a display, for displaying information to a computer user such as a company bidding for a license contract. The mapping of inputs may reside on a computer-readable medium. The term a "computer-readable medium" as used herein refers to any medium or media that participate in providing instructions to processor for execution. Such a medium may take many forms, including but not limited to, volatile media, non-volatile media, and transmission media. Volatile media includes dynamic memory, such as main memory. Non-volatile media includes, for example, optical or magnetic disks, such as storage device. Transmission media includes coaxial cables, copper wire and fiber optics, including the wires that comprise a bus. Transmission media can also take the form of acoustic or light waves, such as those generated during radio wave and infrared data communications.

Common forms of computer-readable media include, for example, a floppy disk, a hard disk, flexible disk, magnetic tape, or any other magnetic medium, a CD, CD-ROM, any other optical medium, punch cards, a RAM, a PROM, a FLASH-EPROM, and EPROM, any other memory chip or cartridge, a carrier wave, or any other medium from which a computer can read.

Varying forms of computer readable media may be involved in carrying sequences of one or more instructions to the processor for execution. The computer system may include a communication interface coupled to bus. The communication interface provides a two-way data communication coupling to a network such as any packet switched local area network (LAN) or an asymmetrical digital subscriber line (ADSL) card, an integrated services digital network (ISDN) card or a modem to provide a data communication connection to a telephone line.

The network typically provides data communication through one or more networks to other data devices such as via an IP (Internet Protocol) network (e.g., the Internet or an Intranet) that transmit notifications and receive data, including program code, through the network(s).

In an embodiment, the trading system 10 includes an exchange platform 11 including a trading server 12 that serves as the "back-end" (i.e., IP processing system) of the present invention. Connected to trading server is a database 24 and an IP prior art database 26. The trading server 12 is connected to a Web server 18 which sends out web pages in response to Hypertext Transfer Protocol (HTTP) or Hypertext Transfer Protocol, Secured (HTTPS) requests from remote browsers. The web server provides a "front end" for the exchange system 10 via graphical user interface (GUI) to users of trading system 10 in the form of Web pages that have, for example, license contract trading information including lists of pending contracts and currently bid prices via a plurality of workstations 14a-14n, 18a-18n and administrative workstations 20. Included in the back end is a trading engine 28 that supports a purchasing feature or module (e.g. supported by a computer server and software) P1 for providing the purchase of license contracts; a selling feature or module (e.g. supported by a computer server and software) S1 for providing the selling of license contracts; a clearing feature or module (e.g. supported by a computer server and software) C1 for providing the execution of license contracts; and a correlation feature or module (e.g. supported by a computer server and software) C2 to indicate how the price bid for the contract correlates with the variable term of the underlying license, such as the royalty rate.

The Internet 16 of the outside of the LAN may include a plurality of external workstations 18a-18n that allow traders, bidders, speculators and market watchers to remotely access and use the exchange 10. The system may be run in a distributed fashion over a plurality of network elements connected via the LAN. Databases physically located on one or more computers may or may not be integrated in the same servers. Communication between parties using the exchange system may be accomplished through any suitable communication means, such as a telephone network, Internet, Intranet, point of sale device, personal digital assistant, cellular phone, kiosk, online communications, wireless communications, off-line communications, transponder communications, etc. For security reasons, any databases, systems, or components of the present invention may consist of any combination of databases or components at a single location or at multiple locations. Each database or system may include any of various suitable security feature or module (e.g. supported by a computer server and software)s, such as firewalls 12, access codes, encryption, decryption, compression, decompression, and/or the like. Some or all of the aforementioned components make up the exchange trading platform 11 of the present invention.

At step 10, a premium is paid to the patent owner upon the purchase of each contract. For example, when a price of $5,000 is set for a contract, it is paid directly to the patent owner. This is a means of raising funds for the patent owner and provides incentive for the patent owner to list his patent on the exchange 10. Payment of the premium can be a means of raising funds for the patent owner even if the contract is not closed out (i.e., if the underlying license for the contract is never executed). In an alternate embodiment, the price of the contract may have no relationship to the premium paid to the patent owner and there may be a flat premium set which is paid to each and every patent owner for the underlying contract, regardless of the price that is set for the contract. For example, a standard premium of $25,000 may be set for each contract that the purchaser of the contract must pay. A portion of that premium may go to the patent owner, another portion of the premium may go to the exchange 10 in order to cover expenses for the exchange 10. As well, some of the premium may also be paid to the traders of the contracts such as a market maker or other brokers involved in the trading.

At step 11, trading of the patent license contracts occur during the term of each contract and such trading set a market price for the patent license contract. Third parties and the contract owner's may trade the contract at any desired price (above the contract owners reserve price). For example, if the underlying patent for the contract relates to technology which helps to refine petroleum more quickly and during the contract term the price for barrels of oil rises dramatically; the value of the perceived technology will be deemed to have been increased. Thus, the price of the contract would likely also rise. On the other hand, if during the term a new technology is introduced which is being used by refineries, other than the patented technology underlying the contract, the contract price is likely to go down. As well, if during the term a favorable decision is issued in related litigation which strengthens the patent, the contract may be deemed to be more valuable and the price for purchasing that contract would likely go up.

The exchange 10 must carefully set the number of contracts to be listed in order to provide for scarcity of these contracts. In some cases where there may be only hundreds of potential licensees who would purchase these contracts, the number of contracts listed for the underlying patent will be very limited. For example, if the exchange 10 determines that there are currently 900 potential infringers of the underlying patent, it may only issue 500 contracts; in order to provide for liquidity and a robust market for trading contracts. In other circumstances, the exchange 10 may provide liquidity by acting as a purchaser or buyer of the contracts itself, to be sure that there is always a purchaser and buyer for all the contracts being listed.

In another embodiment, a market maker will be present for each auction to allow for speculation to occur on the sale price or rate for each contract. For example, Company A (who desires to obtain a license to the patent underlying the contract) bids $50,000 for license contract "W100" (for the Widget technology where the contract price is correlated to a royalty rate to be paid under the executed contract of 5.0%). Speculator 1, who believes the contract price is too low and that at a later time in the auction other companies will pay a higher price offers to buy Company A's W100 contract (and possibly contracts of other companies) for $51,000 (representing a royalty rate to be paid under the executed contract of 5.1%). While this offer by Speculator 1 occurs, the exchange 10 allows for the other 499 contracts to be traded which will act to set a trading price for the W100 contract. In such a situation, the market maker for the W100 auction may see that the W100 contracts are likely to climb higher and may purchase 10 contracts at $51,000 each. Sensing that higher pricing might continue, ten companies who need licenses may then enter the auction and purchase the contracts at $52,000 each from the market maker. Such a transaction would net the market maker $10,000 and result in the ten purchasing companies obtaining the right to execute the license contracts at a later date (for example, 3 months) and obtain a license at a royalty rate of 5.2% of the net sales price of widgets sold by the companies (or according to the other pre-established terms listed in the W100 contract).

Meanwhile, having seen the purchase price of $52,000 of the market makers contracts via the transparent trading system 11 of the exchange 10, Company A might turn down Speculator 1's $51,000 offer. Because Company A feels that since it was able to get a license contract at a low rate, it will provide a competitive advantage to Company A to manufacture Widgets and pay only a 5.1% royalty—while its competitors pay a higher 5.2% royalty. In an embodiment, the actual names of the bidding companies is not disclosed via the exchange trading system 10 during the auction and Company A can only speculate who its competitors are who paid a higher price for the license contracts. In an alternate embodiment, the exchange 10 may allow for a completely transparent bidding process where the name of the company or speculator making each bid must be disclosed.

As trading continues, companies and speculators will monitor market data that may affect the value of the license obtainable under the W100 license contract during the trading period (which may last from many hours to many days depending on the number of contracts being offered) for the companies that may need a license (because they may be currently infringing the underlying patent of the W100 contract or may want to enter the Widget market). In view of the above example, it can be understood that use of liquidity features or modules such as facilitating the bidding by speculators, allowing market makers to control and participate in the trading, providing a scarcity feature or module (e.g. supported by a computer server and software) for controlling the number of contracts available and the time period for the auction; a sufficiently liquid market can be established that can set market rates for patent license contracts, even though the total number of contracts may be only in the hundreds and each underlying patent is unique. Such a system might be used to establish a hypothetical durable goods monopoly for the goods or services underlying the license contract so that purchasers of such contracts are assured that relatively limited license grants that will occur.

Further, different types of auctions including reverse auctions, Dutch auctions, Vickrey auctions, etc. can be used to motivate different parties to buy and sell the license contracts and to affect the pricing of the contracts. For example, a type of uniform price auction could be used where the $100^{th}$ (or some other preset number) bid will be the bid price that sets a uniform price for all those obtaining a license contract (e.g. if the $100^{th}$ bidder purchased a contract at $52,000 that correlated to a 5.2% royalty rate all other contracts would be set at 5.2%). In an alternate embodiment, the last twenty five parties bidding on the contracts would set the variable component of the contract (e.g. the royalty rate or some other term). If such auction systems were used, integrity procedures must be put in place to be sure that the trigger point for setting the uniform variable rate (e.g. bid price correlated to a royalty rate) could not be manipulated by the bidders and that each bidder for the contracts would be committed to actually making, using, selling or importing the goods or services underlying the contract—so that they could not merely execute the license agreement and never pay a royalty.

Thus, it can be understood that during the term of the contract, much trading of the contract may occur between many parties and many events may occur which will change the price of the contract. It is also to be understood that hundreds of contracts on different patents are to be traded simultaneously establishing a wide ranging, dynamic, technology marketplace.

As well, during a contract term the average pricing during that period could provide for very useful information for many other purposes. For example, other contracts on patents dealing with similar technology could be analyzed in order to set such prices when such contracts are being listed. As well, the pricing range for the contracts may also provide for a basis for determining reasonable royalties of the patents or related patents in litigation or in negotiation between parties for related licenses. Investment bankers could use the information to value stocks in companies having technology similar to such patent license contracts. Therefore, it is understood that the market forces involved in setting the pricing of these contracts can provide extremely valuable data that could be used across entire industries for determining valuation of technology.

At step 12 the patent license contract may either be executed by the owner of the contract at the end of the term, or it may be allowed to expire without the patent owner executing the license. For example, a corporation who is involved in litigation with the patent owner who is facing an on-going lawsuit and much cost and expense for that lawsuit and has purchased a patent license contract for the litigated patent, may decide at the end of that term that it would be better to execute the license underlying the contract rather than continue with the litigation. However, if the price at which the corporation had purchased the contract is much higher than the current market price of the contract (and there are additional contracts being listed for that patent) then the owner of that contract may decide to simply let it expire without executing it hoping that it can obtain a patent license contract at a lower rate at a future date. Thus, it can be understood that this exchange system provides an option for corporations who are being sued or offered licenses to obtain a patent license at a rate at which the market has had some input in setting the rate. This is likely to be viewed much more favorably by CEOs rather than having to take the license at a price that is demanded by the patent owner.

Other types of pricing mechanisms for the contracts may be undertaken as well. For example, the price need not be correlated to the royalty rate of the contract. The price may be correlated to a lump sump license fee or may be correlated to an overall value of the patent (e.g., the total amount of royalties assumed to be taken in under the patent for a specified period). As well, the pricing of the contract should be correlated (as discussed above) in order to encourage the maximum amount of liquidity for these contracts. Such pricing should encourage those who want to use the technology to purchase the contracts and to hold on to the contracts and execute them when the market forces have indicated that the underlying technology is as valuable or more valuable than the price set for the contract. The pricing should also take into account the proper compensation due to a patent owner who is licensing its technology. Pricing of the contracts in order to take into account such requirements by a patentee and licensee can be determined using known valuation techniques such as described in U.S. patent application no. 2001/0042034, incorporated herein by reference.

In an alternate embodiment of the system, the contract may require the purchaser to execute the license at expiration or face a significant buyout penalty. By listing his patent(s) on the exchange 10, a patent owner is giving up his right to exclude others from the market. For example, in a case where a patent owner has undertaken an infringement lawsuit against an infringing the company A, the patent owner generally has the right to pursue an injunction against company A in order to prohibit company A from using the underlying technology. However, if the patent owner has listed his patent on the exchange 10, company A during the litigation may in turn purchase a contract which gives company A the right to have a license. Therefore the threat of injunction via the lawsuit is no longer driving company A to take a license. This is a powerful motivation that the patent owner is giving up by listing his patent on the exchange 10. Therefore, some buyout of the contract or penalty when it is not executed may provide some incentive to the patent owner to list and give up his right of injunction against patent infringers.

In an embodiment, the exchange 10 may keep the names of the purchasers of contracts confidential so that the underlying patent owners are not aware of which parties can execute the contracts. This will allow the company purchasing the patent to maintain its position during a license negotiation that the patent is not being infringed despite the fact it has purchased a contract.

In a further alternate embodiment, each contract can only purchase a portion of an underlying license and multiple contracts may be needed to be purchased in order to obtain the entire license. This will help to produce more liquidity in the market. In another embodiment, each contract may be a portion of the royalty rate and can also correlate to a lower royalty rate based on the additional number of contracts that are purchased.

In an alternate embodiment, premiums may be directed to the purchaser to encourage them to sell when the price has gone up. For example, if a contract is priced at $5,000 and the owner of the patent executes the underlying license at a 5% royalty rate such contract owner is unlikely to sell the contract for $6,000 (e.g., a $1,000 gain per contract), when that underlying patent owner might lose millions of dollars for that 1% rate in the underlying license. Therefore, additional incentive might be provided to be paid to the contract owner in order to encourage them to sell when the price of the contract rises.

In an alternate embodiment, the contract price may be based on a multiple of a contract price (e.g., each $100 is worth $1,000,000 in value of the license). For example, a contract having a price of $1,000 may provide $10,000,000 in license coverage (e.g., $10,000,000 worth of royalty payments).

In a further embodiment of the invention, a separate corollary or corresponding exchange may be set up to trade options based on the underlying contracts. In other words, an option may be available based on the underlying contract in order to hedge the positions of the contract owners. The option may be a put if the option owner believes that the underlying contract price will go up or maybe a call if the option owner believes that the underlying contract price will go down. In this way a patent license options exchange may be established in order for third parties to hedge their positions on certain technology, whether they are owners of the underlying patent license contract owner or just a third party speculating on the market. The license option market may be set up based on other underlying contracts or securities tied to patents or patent portfolios as well.

In an alternate embodiment, the pricing of the contracts may be arranged in a way to provide for an inverse relationship between the royalty rate and the price paid for the contract e.g., as the price of the contract increases the royalty rate will decrease. For example, the following pricing schedule may be provided.

| | |
|---|---|
| 1% = | $10,000 |
| 2% = | $ 9,000 |
| 3% = | $ 8,000 |
| 4% = | $ 7,000 |
| 5% = | $ 6,000 |
| 6% = | $ 5,000 |
| 7% = | $ 4,000 |
| 8% = | $ 3,000 |
| 9% = | $ 2,000 |
| 10% = | $ 1,000 |

Thus as can be seen in the above pricing example, the contract purchaser will pay more for a contract having a lower royalty rate.

In an alternate embodiment a patent investment trust may be set that sets its price based on the royalty income that's brought in under the patent. The price of the patent investment trust stock will go up and down based on the amount of royalty income.

In all of the above embodiments, the trading of the contracts can be implemented either on an actual trading floor or electronically. The electronic trading of the contracts can occur through the Internet by a Web site or by a private electronic distribution system. For the above market to operate, it would be preferable to require that the patent owners make certain information available. For example, if the patenet owner for the underlying patent contract has current licensees, the patent owner should be obligated to disclose the royalty revenue obtained under licenses for that patent. This data will help purchasers of the contracts to more accurately set the pricing and pay the proper amount for each contract in view of the current licensing data.

A benefit of the above system is that although during certain periods only a limited number of contracts to obtain licenses will be available, however, after each contract period additional licenses could be available so that the patent owner is not restricted in the amount of licenses it may offer and have executed.

The above examples are based on a one-to-one evaluation pricing method where each contract is priced based on a one-to-one correlation with its underlying patent. However, other types of pricing methods may be provided that have other means of determining the pricing. For example, a group or category pricing method may be provided.

In an alternate embodiment, the pricing of the contracts may be based on a separate base market with regard to related groupings of patents or other technology. For example, the other base market may be a bond market. In an embodiment, individual bonds may be established and traded based on a particular patent and its royalty revenue. Where there are established patents or patent portfolios with established royalty streams that may be estimated in the future with low levels of risk, those underlying patents could have bonds traded that are tied to the royalty streams. For example, there are many examples of patent pools in well-known technologies such as MPEG (e.g., MPEG LA), for which ongoing and well established royalty streams are predictable. For such patents or portfolios bonds may be established and traded. Once a bond market is established for a multitude of patents, these patents/bonds can be classified or grouped with regard to their category and valuation. For example, certain technology areas can be grouped together. Patents may also be grouped based on strength, the scope of the claim coverage or other factors. As the bonds are traded, the trading prices for the bonds can be used to help to establish pricing (e.g., an underlying royalty rate) for patent license contracts in related categories. Thus, even though a newly issued patent may not have the predictable royalty revenue of the patents underlying the bond market for the patents, where the newly issued patent is in a similar category by technology and has a similar valuation based on the strength of the patent and the scope coverage of the claims as an underlying patent that has patent or groups of patents in a bond patent category—the same data can be used to establish the royalty rate that should be set for the newly issued patent e.g., the price of the patent license contract.

In an example where MPEG technology is categorized in a certain area and a patent valuation system is established where a patent is valued from 1 to 100 (where 1 is a weak patent and 100 is a very strong patent); MPEG LA patents (for which bonds have been established) may be determined to have a valuation of between 80 and 100. A newly issued patent covering MPEG technology may be evaluated by the exchange committee. If it is determined that the new MPEG patent is valid and enforceable and its valuation based on certain well known analysis techniques, as discussed above, is between 80 to 100 for that patent; the pricing (e.g., the royalty rate for the underlying patent license) can be set based on the MPEG LA bonds. Well known principles for setting of rates (e.g., mortgages) based on bond trading prices can be used to establish the rates for the patent contracts. Thus, the present invention provides a two-tier system where the patent contracts are priced and based on the active patent bond trading market in place. In an alternate embodiment, a three-tiered system may be provided where there is also an options market which is based on the patent contracts. Such a patent options market which would allow for parties to hedge their-positions in either the patent bonds or the patent license futures contracts.

An alternative auction process for setting a reasonable royalty price or License Fee is provided that promotes transparency in the bidding process, but also maintains anonymity of the bidders. Such a system is especially important where the auction is used in a standard setting in order to avoid any antitrust implications. Further, in an embodiment the auction would only allow a single bid by each bidder (in each round) so that no signaling between bidders may occur. Further, different types of auctioning methods can be used depending on the desirability of the IP being offered, the number of licenses being offered, whether the license is closed-end (e.g. once the predetermined number of licenses are auctioned off, no other licenses will be offered for the life of the IP/patent), what the previous royalty stream (if any) was for the particular IP, the number of speculators or market makers involved in the auction, or other scarcity features implemented. In an embodiment, a modified Dutch or Vickrey auction may work as follows:

A. The patent owner or an independent valuation expert provides a target price or royalty rate. For example, if the expert determines that a 5% royalty is reasonable; then a target bid price can be set at 5.0. Thus, this auction has a 1 to 1 correlation feature where each bidding unit is equal to 1 percentage point. (Other pricing mechanisms for unit rate licenses can be used. For example, if the licensor wishes to auction licenses to use a wireless transmission technology, she could license off bundles of 1 million minutes of air time at $50 each bundle, e.g. a target bid price of 50).

B. The target rate and all information about the technology and accompanying patents are published and posted on the pertinent website. Also posted on the website are details setting the number of licenses to be auctioned, the standard terms of the license (including an initial licensing fee to be paid upon execution of the license) and a date for the auction. For example, 100 licenses may be auctioned on July 1. (In some cases, the licensor may want to commit to only offering these 100 (non-exclusive) licenses for the life of the patent in order to create higher demand. Another alternative would be to offer 100 licenses at the original auction and for the licensor to agree she will not offer any additional licenses for a period of 5 years).

C. On July 1, licensees who have registered and paid a registration fee may anonymously bid for the number of licenses desired and the desired purchase price. For example, one of the bids may be for 1 license at 4.5 (meaning that such a winning bidder would pay a 4.5% royalty rate upon execution of the license). Speculators may bid for more than one license in order to transfer the license later after the auction closes. (An alternative bidding structure may provide for simultaneous multiple price bidding terms discussed below. Also the auction my set a reserve price either publicly or secretly for the lowest rate the patentee would allow).

D. After the close of the auction the licensor will review the submitted bids and determine at what uniform level to set a clearing price. For example, if 90 licenses were bid at 4.5, 4 licenses at 5.0 and 6 licenses at 5.5 the licensor would likely select 4.5 as the clearing price so that all licensees would obtain a license at a 4.5% royalty rate. The bidders at 5.0 and 5.5 would also obtain licenses at the 4.5% rate. However, the licensor could also choose to set the clearing price at 5.5 and only allow for 6 winning bidders. In such an instance the auction rules may allow for the licensor to hold another auction at a later date for the remaining 96 licenses, but only at a rate of 5.5 or higher. The above auction steps are also referred to as an open auction process.

E. Following the auction, a spreadsheet of the bidding results is posted and each winning bidder is advised of the clearing price and the bidder is given 30 days to execute the standard license at the predetermined rate or the bidder's substantial registration fee will be forfeited. So for the example given with respect to the acceptance of the bids at 4.5, all 100 of the offered licenses will be set at a royalty rate of 4.5% and a reasonable royalty rate will have been set according to market forces.

Further, the auction may offer simultaneous multiple price bidding terms such as three bidding methods: 1) royalty rate, 2) unit rate, or 3) one time payment. During the same auction, each bidder may choose either of the bidding methods according to the type of license that she wishes to have. The royalty rate method is as discussed above. The unit rate method would allow bidding on a total number of units. For example, for a wireless communications technology 1 million minutes could be bid at $0.0035/minute (or $3,500). In this example, a target rate would be set in advance by the auctioneer based on an average price per minute of 7 cents. In other words, whether the bidder pays a 5% royalty based on net sales or 0.35 cents for each bundle of 1 million minutes used, she pays $3500. However, the unit price method does not require the licensor to have to inspect the licensee's books and receive a quarterly sales statement, so the bidder may prefer to pay in advance for each bundle of 1 million units (minutes). The bidding may allow for additional bundles to be bid on so that the license may allow for example, up to 200 bundles of 1 million units each to be bid on.

Finally, the one time payment method would allow a bid of a one time paid up license for perpetual use of the technology. Carrying the previous example forward, the auctioneer or licensor would estimate total sales of an average to large user of the technology. For example, according to public records the licensor may estimate that over 20 year period its largest potential licensee may use 200 million minutes. So if the licensee is charging 0.07 per minute based at the 5% royalty (estimated by the valuation expert) would amount to a $700,000 one time payment. Thus, the auctioneer may set the target one time payment price at $700,000 (some adjustment for the time value of money may be made). At the auction, the bidders may bid any amount starting at that target. Similar to the unit price method, the one time payment method may benefit the licensee since she will not have make any ongoing disclosures of sales to the licensor or keep track of its minutes used for reporting purposes. Such a method also benefits the licensor because she gets the payment all at once. Thus, at the end of the auction the licensor can analyze each of the bids and award 100 licenses based on any one of the three bidding methods offered by the bidders. Some monetary adjustments may be necessary to make each of the simultaneous multiple price bidding terms equivalent.

In another embodiment the auction may provide for a pool of patents to be auctioned simultaneously. For example, a patent pool organization or standards group may pool together a group of patents covering similar technology (or for a standards group: all patents necessary or "essential" to implement the standard), which may all be auctioned at the same time and for a uniform License Fee or rate. For example, using the above open auction method a royalty rate of 5% may be arrived at, so that the licensee can sell a product under the licensed technology and pay one 5% royalty under the entire group of patents.

The above described licensing system may also be combined with an Alternative Licensing Resolution (ALR) Process for Patent Disputes. The purpose of ALR is to provide an effective alternative to expensive patent litigation, particularly where settlement of a patent dispute by licensing of the patented technology is the likely result. An effective ALR process should provide guidance by experienced neutrals on two central issues that arise in patent disputes: validity of a patent and a fair royalty or rate or other licensing fee ("License Fee") to be paid. ALR should also provide a fair and open forum for setting or obtaining a license via a transparent process that promotes the efficient and rapid distribution of patented technology.

In an embodiment the ALR system may include live ALR auction steps occurring for example, via video conference and internet. As an example of one embodiment, the ALR auction may provide the following steps:

A. Each prospective licensee must register and agree to be bound by the rules of the offering as a binding ALR process and agree to execute the standard license agreement presented by the ALR committee (and posted to ALR website 30 days prior to auction) upon acceptance of a license;

B. The licensor presents a discussion of the scope of technology and the IP covering such technology. The licensor can outlines specific representations and warranties it shall provide for IP rights being granted upon execution of a license by a licensee;

C. A neutral or committee made-up of experienced patent attorneys/experts having pertinent, technological backgrounds provides summary of due diligence and prior art review;

D. A valuation expert or committee made up of experienced professionals having patent damage calculation experience in the technology being licensed provide a summary of the due diligence and valuation methodology;

E. The ALR Auctioneer sets an opening price and identifies no. of licenses available (if limited) and the duration of bidding and opens the bidding process; and F. Each prospective licensee views the ALR/Exchange website that lists realtime activity and posts an acceptance of the license by each licensee. In an alternative bidding method and upon request by the licensor, an auction may be held where bidders may change the license rate being offered, e.g. the first 50% of bidders get opening rate, thereafter bidders move bid in increments of 0.10 until rate is 10% above or below opening rate. (Alternative bid structure may be via a modified Dutch auction or Vickrey auction as discussed above).

In an embodiment, the ALR system may include certification and pre-auction steps described as follows:

A. Licensor (e.g. patent owner) submits its IP, such as a patent or patent portfolio and may pay, for example, a $50,000-75,000 certification fee to the Exchange (as depicted at Step 1 of FIG. 1a).

B. At step 2 the Exchange (or ALR body) conducts due diligence to determine if the IP, such as a patent can be listed on the Exchange. For example, in an embodiment such due diligence will comprise an evaluation of patent validity by a patent expert/neutral. At that time the licensor may be required to provide to the ALR body sufficient representations and warranties that there has been no inequitable conduct, all prior art disclosures have been made and all previous licenses have been disclosed. The patent expert or committee then undertakes an analysis and due diligence to determine the likely validity of the underlying IP. (In cases where there is an impediment to a certification of likely validity, the patent committee will make no written record and will advise the patent owner verbally that the application for ALR has been rejected). The Patent Committee may include a claim construction analysis in its evaluation where relevant to the finding of likely validity.

C. After validity has been confirmed then the IP may proceed to the next step of the ALR process. In the alternative, if the validity of the patent is not confirmed then the patentee will be notified that the IP may not be listed on the Exchange and it may pursue other independent licensing avenues (steps 3 and 4 as depicted in FIG. 1a).

D. After validity of the IP is confirmed then as Step 5 a valuation committee or expert determines a License Fee or value for the license (also referred to in the first embodiment as a contract). (Valuation factors used in ALR should not be identical to litigation reasonable royalty factors, so that the evidentiary effect in later litigation can be reduced, e.g. the valuation committee may use well known Georgia Pacific factors, cost method, income method, market method or an efficient component pricing rule (ECPR); but also may consider a discount on licensing rate that factors-in the risk of litigation and may also state in its valuation report that the License Fee would be higher of the licensor were forced to litigate). The validity evaluation and License Fee valuation steps of ALR comprise the certification step of and amount to Croesusifying of a patent/IP (e.g. guarantee of purity of property much as King Croesus did in the $5^{th}$ century B.C. who guaranteed the purity of gold and silver coins in Lydia (Turkey) in order to spread commerce throughout the world). The valuation and patent expert/neutral will follow a set of predetermined criteria to complete its valuation or validity analysis. Such set of evaluation and valuation criteria will be posted on the ALR website and sent to the licensor to agree to prior to engaging the ALR expert(s) to conduct the validity evaluation and License Fee valuation.

E. Following the completion of the certification steps at Step 6, the patent and valuation committees set the value of the IP and advise the IP owner. As well, the patent and valuation committees/experts develop and provide to the licensor a license agreement having standard terms to be offered to the entire group of potential licensees.

F. If after review of the certification reports from the ALR experts/neutrals at Step 7, the IP owner approves the validity certification, License Fee/valuation and standard license agreement it can decide to continue with the ALR process. Thereafter the IP owner should provide a list of potential licensees and other potential licensees the auction may be marketed to.

G. At Step 8 (FIG. 1b), the ALR body sends invitations to participate in ALR Auction to prospective licensees and promotes auction on its website and in trade journals and makes an announcement of the posting of the license offering. The posting may include the listing price, duration of the auction, category of technology covered by the IP, valuation report, a listing symbol, listing date and number of licenses that will be auctioned. Upon receiving an ALR invitation and reviewing the validity report posted on the ALR website, a prospective licensee (or other interested party) may submit prior art (e.g. for $500 each submittal) to the ALR patent expert/committee at least 90 days prior to the ALR auction. Upon receipt of all new prior art, the patent expert can reexamine the patent and provide an updated validity evaluation.

H. At Step 9, after the IP is maintained as valid after a reexamination, a final package including a standard license, valuation parameters, due diligence parameters and auction rules for each particular IP asset is posted to website 30 days prior to auction. The computerized auction system is updated so that on the auction date the licenses may be auctioned via the Exchange platform (via the internet or on a trading floor). The auction is open to license bidders (potential contract purchasers), speculators and other third parties who may want to track the royalty rates; each of whom can monitor the Exchange activities via a workstation connected to the internet (as depicted in FIG. 1*b*).

I. After the auction is closed, the licensees at Step 10, may be required to pay a premium/license fee to the IP owner.

J. Based on the price set for the license (contract), market value for the underlying IP is set at Step 11 (FIG. 1*b*) that may be correlated to the royalty rate.

K. Finally at Step 12, at a date proscribed by the standard license agreement agreed to by the bidders at the outset of the auction, the bidder/licensee shall execute the license and thereafter make payments as required under the license to the IP owner.

The preceding steps would be modified if the IP being auctioned was not a patent. For example, the ALR process could be used to license a trademark, however the validity certification step would not include a review of prior art. In order to implement the above described ALR steps, specific ALR guidelines would be established for an open settlement process, for choosing IP and valuation neutrals members who will certify IP, for elements of due diligence to be reviewed by the IP neutral to certify validity of patents and valuation parameters to be used by Valuation Committee to set License Fees (e.g. use of Georgia Pacific factors); for setting elements of standard licenses to be used for ALR (e.g. most favored nations/term clause; assignability of license without licensor consent so that speculators can participate and bid-up licenses; licensee's acknowledgement that it has conducted it's own due diligence and is not entering license based solely on the validity certificate by Patent Committee or Valuation Committee and holds the Committee members harmless), for rules and guidelines for ALR auctions including website disclaimers of liability and click agreements for waiver of liability for ALR Body, Patent Committee and Valuation Committee members; Establish profile of likely patent owners who will want to participate in ALR (e.g. technology is susceptible to uniform licensing terms, patent covers >20 alleged licensees, etc.) for marketing for ALR; Establish profile of likely licensees who will want to participate in ALR (e.g. sophisticated IP users who can recognize valuable patents) for marketing of the ALR process; Consider whether ALR Body can also provide license management services for frequent ALR licensees who want record keeping and payment tracking services to be outsourced; Obtain a Business Review Letter from the Department of Justice for the ALR process (28 C.F.R. §50.6) in order to clear any anti-trust concerns.

Figure 2:
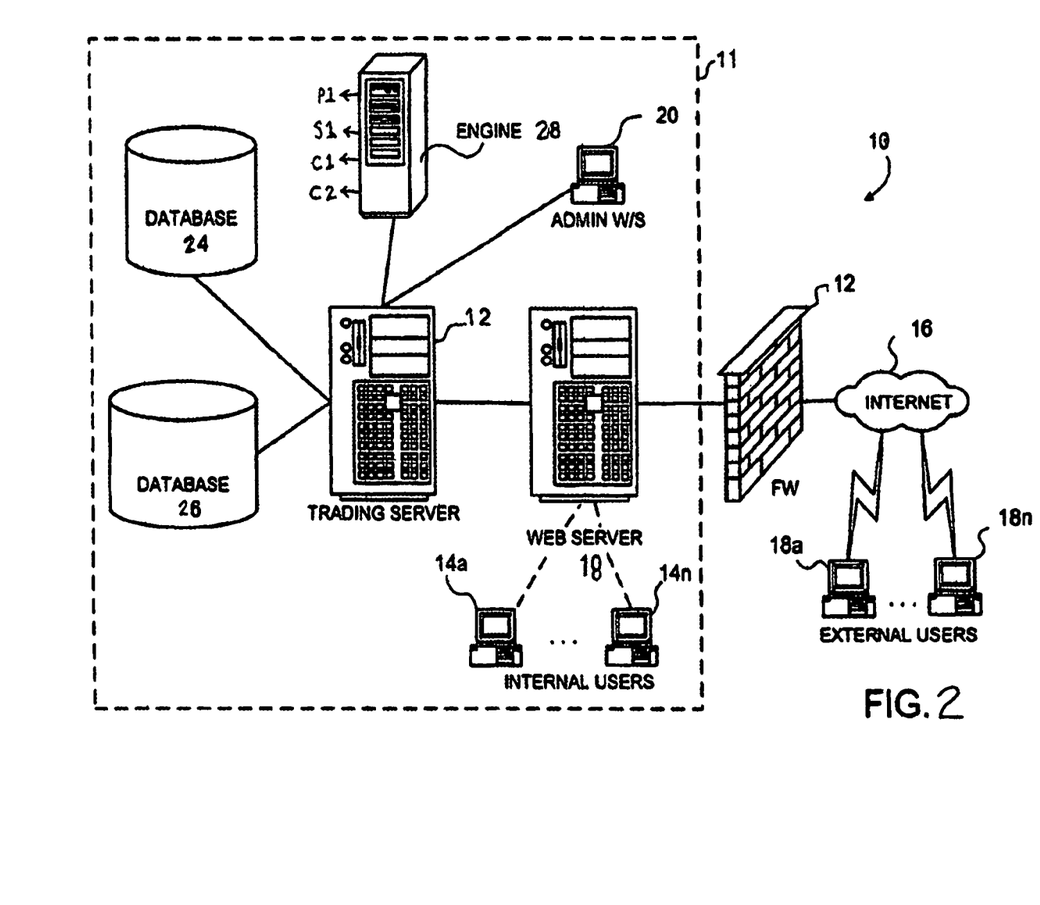
FIG. 2 is a system architecture diagram of the license market system of FIGS. 1a,b.

In an embodiment, the previously provided system may operate using the following system architecture: an ALR exchange 10 including a network system 11 as shown in FIG. 2 that includes hardware such as servers 12, 18 and software systems for enabling the licensing of IP via a database systems 24, 26 to store patent and license information and allowing retrieval of data by authorized users linking via the internet 16 by browsers of workstations 18*a*-18*n* and for auctioning of IP licenses.

The present invention is particularly suited to patent pool groups or standards setting organizations (collectively "SSOs"). SSOs generally require that patentees who offer patented technology to be used in a standard agree to provide licenses to others at fair, reasonable and non-discriminatory (FRAND) terms. The above described system can help to provide such FRAND terms. SSOs could implement the present invention including either the ALR feature or open auction feature, or both, at different times during the standard development process and modify how the present invention is implemented based on the timing of when in the standard setting process the invention is implemented.

For example, an SSO may require all patentees having essential IP to submit such IP to an open auction process (and ALR process) prior to adoption of a standard. In this way all SSO participants would know what royalty rate or Licensing Fee would apply prior to voting for the particular standard. In some circumstances the open auction would occur with the patentee choosing the final clearing price/royalty rate, as described above. In other circumstances, the SSO could set the clearing price/royalty rate. However, in such a circumstance where the SSO sets the clearing price after the open auction, the patentee would have the ability to pull the patented technology from the standards process if it did not believe the clearing price was appropriate.

In another example, the SSO may require that prior to the adoption of the standard, each participant that has IP essential for the standard enter a commitment to submit the IP to the ALR and open auction process (along with the FRAND commitment) if such IP is chosen as the standard. By obtaining such an ex post commitment, the other SSO participants can be assured that an open process including market forces will be used to determined a "fair" and "reasonable" rate. Further, by using a standard license under the ALR process, the SSO participants can be assured that the terms are "non-discriminatory."

In a further example, the SSO may require that in the event that any dispute arises during or after the standard setting process that all SSO participants agree that such disputes will be submitted to an ALR process when terms involving essential IP is at issue. Thus, if a standard is adopted and a third party attempting to obtain a license to use the standardized technology and feels that terms being offered do not comply with a FRAND commitment, it can use the ALR process to obtain a "fair" result. Such a binding ALR commitment will lessen the necessity for patentees to identify its essential IPRs prior to the standard adoption and will reduce the necessity of investigating whether the patentee had any intent to mislead in failing to identify such essential IP.

In an alternate embodiment, the ALR system certification step may include only the patent validity analysis step and the process would proceed without the valuation step. In a further alternate embodiment, the ALR system certification step may include only the valuation analysis and the process would proceed without the patent validity analysis step. Other combinations of the above steps with some of the steps omitted could also be used and continue to provide a streamlined system for distributing IP. In an embodiment the invention provides for a blind expert engagement process that helps to insure the neutrality of the expert. The ALR body or Exchange will engage the expert, but will keep the identity of the client from the expert. More importantly, the expert will not know what type of service the client had requested of the Exchange. For example, the Exchange may provide other expert services, such as standard non-infringement or invalidity opinions for companies who may have a potential infringement issue and need an outside opinion of counsel. Since the Exchange provides both invalidity opinions and ALR services and the expert being engaged is blinded to the type of services being sought by the client; he/she will not be swayed by the unstated interest of the client of the Exchange. Thus, due to the blind engagement process, the expert will not know if he/she is being retained for an ALR assignment—where the client would prefer a finding of validity—or a client seeking a standard opinion of counsel—where an invalidity finding is preferred.

While particular embodiments have been shown and described, it will be apparent to those skilled in the art that changes and modifications may be made without departing from the principles of the patent licensing market, exchange or patent license contracts in their broader aspects. The matter is set forth in the foregoing description and accompanying drawings is offered by way of illustration only and not as a limitation. Some of the above examples provided focused on patent licensing; however, it should be understood that the present invention pertains to the licensing of any type of intellectual property.

What is claimed is:

1. A method of processing a license contract for obtaining a license for intellectual property, the method comprising the steps of:
    posting, via a computerized exchange platform, the license contract and a non-exclusive license agreement to the data base, the license agreement underlying the license contract and the license contract having a variable contract price that correlates to a royalty rate of the underlying license agreement, wherein the computerized exchange platform comprises at least a computer processor and a database, communicatively coupled to at least said processor, for processing offers to adjust a royalty rate of the license agreement;
    receiving, via the computerized exchange platform, an offer to buy the license contract;
    adjusting the royalty rate of the underlying license agreement in accordance with the offer so that the license agreement has an offer correlated royalty rate, wherein a higher offer compared to other offers increases or decreases the royalty rate of the underlying license agreement and a lower offer compared to other offers increases or decreases the royalty rate of the underlying license agreement
    processing the sale of the license contract at the adjusted royalty rate.

2. The method of claim 1 wherein the license contract pertains to a patent and the license contract specifies non-variable license terms including the royalty basis and up front payments.

3. The method of claim 1 wherein the exchange platform provides for electronic trading via the internet and the exchange platform further providing a uniform price auction where the adjusted royalty rate is set based on an average of at least two offers transmitted to the exchange platform.

4. The method of claim 1 wherein the license contract covers particular intellectual property and further comprising the step of posting the license contract on the exchange platform as an alternative to asserting the intellectual property in litigation so that allegedly infringing parties may obtain licenses at rates set by the exchange platform.

5. The method of claim 1 wherein the exchange platform further comprises a purchasing feature and a selling feature for handling the offer to purchase and the clearing of the sale, respectively.

6. The method of claim 1 further comprising the step of a contract purchaser paying a license contract owner a premium upon purchase of each license contract.

7. The method of claim 1 further comprising the step of displaying a copy of the license agreement and an intellectual property professional adjusting the royalty rate in accordance with the offer.

8. The method of claim 1 wherein the exchange platform further comprises a trading engine for processing offers to sell license contracts having simultaneous multiple price bidding terms.

9. The method of claim 8 wherein the trading engine can process multiple offers in order to adjust the royalty rate for the underlying license agreement by calculating the royalty rate that will maximize the number of offers to be accepted and total royalties available for collection.

10. A method for distributing a license for intellectual property (IP), the method comprising the steps of:
    posting, via a computerized exchange platform, an IP report to the database, the IP report including an evaluation of the validity of the IP and a value of the IP, wherein the computerized exchange platform comprises at least a computer processor and a database, communicatively coupled to at least said processor, for processing offers to adjust a term of the license for the IP;
    displaying, via the computerized exchange platform, the IP report on a website linked to the exchange platform for review by a potential licensee;
    auctioning the license for the IP wherein the exchange platform receives an offer submitted by the potential licensee in order to correlate a royalty rate term of the license with the offer from the potential licensee;
    adjusting the royalty rate term of the license in accordance with the offer so that the license has an offer correlated royalty rate term, wherein a higher offer compared to other offers increases or decreases the royalty rate term of the license and a lower offer compared to other offers increases or decreases the royalty rate term of the license; and
    distributing the license at the adjusted royalty rate term.

11. The method of claim 10 wherein the exchange platform processes simultaneous multiple price bidding terms including a royalty rate, a total rate for a paid-up license and a per unit rate.

12. The method of claim 10 wherein the auction is a modified Dutch auction and offers are placed for licenses having an underlying license agreement and wherein a price term of the offer correlates to a royalty rate term of the license agreement so the offer for the license acts to adjust the royalty rate.

13. The method of claim 10 further comprising certifying the validity of the IP and setting a license rate.

14. The method of claim 10 wherein the exchange platform is connected to the internet and stores auction data, and wherein an opening bid price may be accepted or rejected.

15. The method of claim 10 wherein a price for the IP is set according to an open auction process where a licensor chooses a uniform clearing price selected from a group of differing offer prices.

16. The method of claim 10 wherein the IP is a patent and the license has a non-exclusive term and the method further comprising the step of displaying a copy of the license and an intellectual property professional adjusting the royalty rate term in accordance with the offer.

17. The method of claim 10 further including a reexamination step where third parties can submit prior art pertinent to the IP.

18. A computerized system for distributing intellectual property (IP) comprising:
- a computer programmed to store IP valuation data and offers for license contracts; and
- a hardware server having a trading engine programmed to process license contracts based on a uniform clearing price selected from a group of differing offer prices; and
- an exchange platform, communicatively coupled to the computer and the hardware server, and programmed to:
  post the license contract and a non-exclusive license agreement to the computer, the license agreement underlying the license contract and the license contract having a variable contract price that correlates to a royalty rate of the underlying license agreement;
  receive an offer to buy the license contract;
  adjust the royalty rate of the underlying license agreement in accordance with the offer so that the license agreement has an offer correlated royalty rate, wherein a higher offer compared to other offers increases or decreases the royalty rate of the underlying license agreement and a lower offer compared to other offers increases or decreases the royalty rate of the underlying license agreement; and
  process the sale of the license contract at the adjusted royalty rate.

19. The system of claim 18 wherein the trading engine processes simultaneous multiple price bidding terms.

* * * * *